United States Patent [19]

Maietti

[11] Patent Number: 5,168,002
[45] Date of Patent: Dec. 1, 1992

[54] NOISELESS, PRINTABLE SELF-ADHESIVE TAPE

[75] Inventor: Adriano Maietti, Casale Monferrato, Italy

[73] Assignee: Vibac S.p.A., Alessandria, Italy

[21] Appl. No.: 764,587

[22] Filed: Sep. 24, 1991

[30] Foreign Application Priority Data

Sep. 24, 1990 [IT] Italy ............... 67711 A/90

[51] Int. Cl.$^5$ ............... C09J 7/02
[52] U.S. Cl. ............... 428/352; 428/354
[58] Field of Search ............... 428/40, 354, 352; 525/61

[56] References Cited

U.S. PATENT DOCUMENTS 4,699,816 10/1987 Galli ............... 428/352
4,708,907 11/1987 Flutti ............... 428/352

FOREIGN PATENT DOCUMENTS 0042410 4/1979 Japan ............... 428/352

Primary Examiner—Jenna L. Davis
Attorney, Agent, or Firm—Sughrue, Mion, Zinn, Macpeak & Seas

[57] ABSTRACT

A noiseless, printable self-adhesive tape comprises a substrate in the form of an olefinic polymer film, a pressure-sensitive adhesive layer on one face of the substrate, and a printable, non-stick layer on the other face of the substrate. The non-stick layer is formed by a composition including a chlorinated olefinic resin and an acrylic resin in which the ratio by weight of the acrylic resin to the chlorinated olefinic resin may vary from 4:1 to 1:4. The composition also includes from 0.1 to 2 parts by weight of a non-stick agent per 100 parts by weight of the sum of the first two components, the non-stick agent being prepared by the reaction of an alkyl isocyanate with polyvinyl alcohol and a reactive silicon compound.

6 Claims, No Drawings

NOISELESS, PRINTABLE SELF-ADHESIVE TAPE

DESCRIPTION

The present invention relates to a pressure-sensitive, adhesive tape comprising:
- a substrate in the form of an olefinic polymer film,
- a pressure-sensitive adhesive layer on one face of the substrate, and
- a printable non-stick layer on the other face of the substrate.

During the production of self-adhesive tapes of the type mentioned above, the two faces of the polymer substrate are covered by the adhesive layer and by the non-stick layer respectively and the tape is then wound into rolls so that the adhesive face of each turn of the roll sticks to the non-stick side of the adjacent turn. The non-adhesive face of the tape is then printed with ink, for example, of the polyamide or vinyl type so that it can act as a warning, an identification or simply an advertisement. In order to carry out this operation, the tape, which has previously been rolled up, has to be unrolled at a high speed, producing a noise which may be damaging to the operators supervising the process. This loud noise is also produced when the final user of the tape unrolls it for use.

The object of the present invention is to provide an adhesive tape which produces little noise when it is unrolled and which, although it has a polyolefinic substrate, can be printed with vinyl-based inks which up to now have been used widely in the adhesive-tapes sector but have been limited to the printing of PVC-based substrates.

This object is achieved by virtue of a self-adhesive tape of the type indicated above, characterised in that the non-stick layer is constituted by a composition including a chlorinated olefinic resin and an acrylic resin in which the ratio by weight of the acrylic resin to the chlorinated olefinic resin may vary from 4:1 to 1:4, the composition also including from 0.1 to 2 parts by weight of a non-stick agent per 100 parts by weight of the sum of the first two components, the non-stick agent being prepared by the reaction of an alkyl isocyante with polyvinyl alcohol and a reactive silicon compound.

The tape according to the invention produces little noise when it is unrolled either prior to printing or prior to use.

In a preferred embodiment of the invention, polypropylene is used as the olefinic polymer for the substrate film. This material can be printed with a vinyl ink of the type usually used for printing adhesive tapes with PVC-based substrates without difficulty by virtue of the interposition of a non-stick layer according to the invention.

The non-stick layer is preferably formed with the use of a chlorinated olefinic resin with a chlorine content of between 24 and 35%, a melting point of between 85 and 105° C., viscosity (measured as a 10% solution in toluene according to Brookfield's method) of between 30 and 100 mPa, and a molecular weight of about 80,000 atomic mass units. Of the products available commercially, CP 343-1 from Eastman Coating Chemicals and Hardlens from Toyo Kasey Kogyo Co. Ltd. may be mentioned.

Still for forming the non-stick layer, an acrylic resin selected from the group consisting of methyl methacrylate, methyl acrylate, isobutyl methacrylate and methyl/butyl methacrylate/acrylate copolymers is preferably also used. These resins have glass transition temperatures of about 50° C. and acid values (expressed as milligrams of potassium hydroxide per gram of the substance) of zero. Of the products available commercially, the following may be mentioned: Plexigum from Rohm, Dianal-Br from Mitsubishi Rayon Co., Synthacril from Hoechst, Setalux from Akzo, Macrynal from Hoechst, and Neocryl from Polyvinilchemie.

The non-stick agent is preferably formed with a polyvinyl alcohol having a Brookfield viscosity of between 5 and 45 mPa.s with a surface-active silicon-glycol polymer, preferably Dow Corning 193, as the silicon compound and stearyl isocyanate as the alkyl isocyanate.

The non-stick layer is preferably formed by a composition including a chlorinated olefinic resin and an acrylic resin in which the ratio by weight of the acrylic resin to the chlorinated olefinic resin may vary from 1:1 to 1:2, the composition also including from 0.3 to 0.7 parts by weight of a non-stick agent per 100 parts by weight of the sum of the first two components, the non-stick agent being prepared by the reaction of an aklyl isocyanate with polyvinyl alcohol and a reactive silicon compound.

The adhesive layer is formed by conventional products based on natural rubber, synthetic and natural resins, and plasticisers.

Further characteristics and advantages of the self-adhesive tape according to the invention will become clear from the following example which describes a preferred embodiment.

EXAMPLE

Samples of printable, self-adhesive tape were prepared with the use of a substrate constituted by a two-directional polypropylene film treated by corona discharge on one face and flame on the other face, according to conventional techniques.

A 10% solution of a polymeric composition in toluene was used to deposit the non-stick layer on the reverse side of the tape. The polymeric composition had the following formulation expressed in percentages by weight:

| | |
|---|---|
| CP343-1 | 60 |
| Dianal BR 115 | 39.5 |
| non-stick agent | 0.5 |

The non-stick agent was formed with the use of a polyvinyl alcohol with a Brookfield viscosity of 25 mPa.s, stearyl isocyanate, and the silicon-glycol surface-active copolymer Dow Corning 193.

The non-stick solution was spread on one face of the polypropylene substrate and the solvent was evaporated in an oven at a temperature of from 70 to 100° C., until evaporation was complete.

A conventional primer and an adhesive of known type constituted by a natural rubber, a tackifier resin and a plasticiser oil in a solvent was deposited on the other face of the substrate. After the solution containing the adhesive had been deposited, the solvent was removed by hot air. The finished adhesive tape was then wound onto reels and cut into rolls of the desired sizes. The tape was then unrolled and printed with the use of a flexographic printer at a speed of about 150 metres per minute.

Samples of self-adhesive tape produced in the manner indicated above were tested to evaluate their adhesion, rolling ball tack, loop tack, unrolling force and the fixing of the ink both immediately after production and after aging in a heater at 45° C. for five days.

The data obtained are given in the tables below. The values are wholly satisfactory as regards the performance required for adhesive tapes.

TABLE 1

Chemical and physical characteristics of tapes immediately after printing:

| | | |
|---|---|---|
| Adhesion (peel adhesion) | (g/cm) | 210–200 |
| Rolling ball tack | (cm) | 0 |
| Loop tack | (g/cm) | 260–260 |
| Unrolling force | (g/cm) | 230–210 |
| Ink fixing | no set-off | |

TABLE 2

Characteristics of the printed tapes after aging in a heater at 45° C. for 5 days.

| | | |
|---|---|---|
| Adhesion (peel adhesion) | (g/cm) | 230–230 |
| Rolling ball tack | | 0 |
| Loop tack | (g/cm) | 253–263 |
| Unrolling force | (g/cm) | 270–280 |
| Ink fixing | no set-off | |

The noise produced when the tapes were unrolled was comparable to that produced by tapes which have polyvinyl chloride substrate films, which are known to be quieter, rather than polypropylene films.

What is claimed is:

1. A pressure-sensitive self-adhesive tape including:
   a substrate in the form of an olefinic polymer film,
   a pressure-sensitive adhesive layer on one face of the substrate, and
   a printable, non-stick layer on the other face of the substrate, wherein the non-stick layer is composed of a composition including a chlorinated olefinic resin and an acrylic resin in which the ratio by weight of the acrylic resin to the chlorinated olefinic resin is from 4:1 to 1:4, the composition also including from 0.1 to 2 parts by weight of a non-stick agent per 100 parts by weight of the sum of chlorinated olefinic resin and the acrylic resin, the non-stick agent being prepared by the reaction of an alkyl isocyanate with polyvinyl alcohol and a silicone/glycol polymer.

2. A self-adhesive tape according to claim 1, wherein the olefinic polymer used for the substrate film is polypropylene.

3. A self-adhesive tape according to claim 1, wherein the chlorinated olefinic resin has a chlorine content of between 24 and 35% by weight.

4. A self-adhesive tape according to claim 1, wherein the acrylic resin is selected from the group consisting of methyl methacrylate, methyl acrylate, and isobutyl methacrylate 5. A self-adhesive tape according to claim 1, wherein the non-stick agent is formed with a polyvinyl alcohol having a Brookfield viscosity of between 5 and 45 mPa.s and a silicon/glycol surface-active copolymer as the silicon compound and stearyl isocyanate as the alkyl isocyanate.

6. A self-adhesive tape according to claim 1, wherein the non-stick layer is formed by a composition including a chlorinated olefinic resin and an acrylic resin in which the ratio by weight of the acrylic resin to the chlorinated olefinic resin is from 1:1 to 1:2, the composition also including from 0.3 to 0.7 parts by weight of a non-stick agent per 100 parts by weight of the sum of the chlorinated olefinic resin and the acrylic resin, the non-stick agent being prepared by the reaction of an alkyl isocyanate with polyvinyl alcohol and a silicone/glycol polymer.

* * * * *